United States Patent
Bateman et al.

(10) Patent No.: US 6,249,254 B1
(45) Date of Patent: Jun. 19, 2001

(54) FLAT PANEL ANTENNA

(75) Inventors: Blaine Rexel Bateman, Louisville; Robert Eugene Munson, Boulder, both of CO (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 09/651,060

(22) Filed: Aug. 30, 2000

Related U.S. Application Data

(63) Continuation-in-part of application No. 09/245,477, filed on Feb. 5, 1999.

(51) Int. Cl.$^7$ .................................................. H01Q 1/38
(52) U.S. Cl. .......................... 343/700 MS; 343/846; 343/702; 343/703
(58) Field of Search .......................... 343/700 MS, 846, 343/702, 829, 830, 906, 711, 703; 29/600; H01Q 1/38

(56) References Cited

U.S. PATENT DOCUMENTS 5,828,340 * 10/1998 Johnson ........................ 343/700 MS
5,847,682 * 12/1998 Ke ................................. 343/700 MS
6,157,344 * 10/1998 Bateman et al. .............. 343/700 MS

* cited by examiner

*Primary Examiner*—Hoanganh Le
(74) *Attorney, Agent, or Firm*—E. C. Hancock; F. A. Sirr; Holland & Hart LLP

(57) ABSTRACT

A small size, flat panel, $\frac{1}{6}^{th}$ wavelength antenna is provided. A flat copper-clad dielectric substrate is processed on a first flat side to produce a copper triangular or pseudo triangular-shaped radiating element having a linear copper feed line that extends from the triangle apex. The substrate is also processed on its opposite flat side to produce a rectangular-shaped first copper ground plane element that underlies at least a portion of the copper feed line, but does not underlie the copper radiating element. The first side of the substrate may also be processed to produce a second copper ground plane element that is out of physical engagement with both the copper feed line and the copper radiation element. Aligned through holes are formed in the first ground plane element and the substrate. The metal sheath of a coaxial cable connects to the copper ground plane member(s), and the cable center conductor penetrates the aligned through holes and connects to the copper feed line. The antenna substrate may be a portion of a printed circuit board, or the like, that is within a mobile wireless communication device, such as a laptop computer or a cellular telephone. The antenna ground plane element(s) may also function as the ground plane for another antenna, such as a GPS antenna.

13 Claims, 8 Drawing Sheets

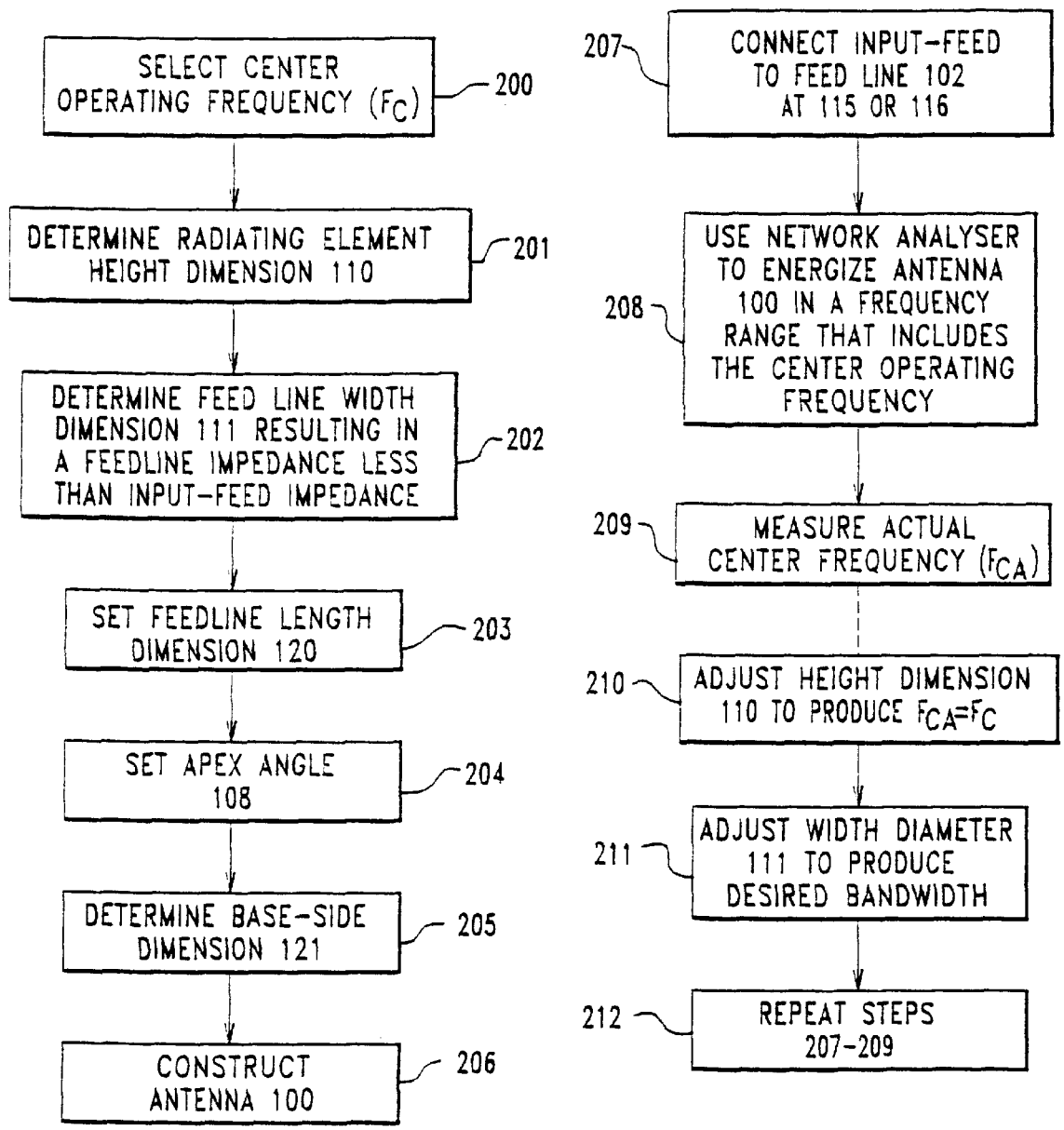
FIG. 17a                    FIG. 17b

FLAT PANEL ANTENNA

CROSS REFERENCE TO RELATED APPLICATION

This application is a Continuation In Part of patent application Ser. No. 09/245,477 filed on Feb. 5, 1999 for FLAT PANEL ANTENNA.

BACKGROUND OF THE INVENTION

1. Field of the Invention

This invention relates to the field of antennas, and more specifically to a flat panel antenna whose field pattern is toroidal, whose polarization is along the antenna's long axis, and which provides omnidirectional transmission in any H-plane that is perpendicular to the antenna's long axis, and two transmission lobes in any E-plane that is parallel to and contains the antenna's long axis.

2. Description of the Related Art

The art has provided a number of small patch antennas that have been generally useful for their limited intended purposes. However, the need remains in the art for a small, thin, antenna that can be manufactured as a stand-alone antenna, or that can be integrated into a mobile or fixed position wireless communication device by using a portion of the device's printed circuit board, or the like, as the dielectric substrate of the antenna, and by providing a metal coating on one side of the substrate to function as an antenna radiating element, and to provide a metal coating the opposite side of, or on both sides of, the substrate to function as an antenna ground plane element.

SUMMARY OF THE INVENTION

The present invention provides a small indoor/outdoor, shock tolerant, flat panel, transmit/receive antenna having a torodial field pattern. The antenna's polarization is along its long axis. The antenna has omnidirectional transmission coverage in any H-plane that is perpendicular to the antenna's long axis. The antenna has two transmission lobes in any E-plane that is parallel to and contains the antenna's long axis. A nominal peak gain of 3 dBi is provided, with a nominal 240 degree 3 dB beam width in the H-plane, and with a nominal 80 degree 3 dB beam width in the E-plane.

In a preferred embodiment of an antenna in accordance with this invention, a unitary construction is formed on a copper clad, flat, planar, low loss, dielectric substrate. The substrate has a first flat side, a second flat side that is generally parallel to the first flat side, a first edge portion, a second edge portion that is located opposite to the first edge portion, and an antenna long axis that extends between the first and second edge portions. A triangular shaped, or pseudo triangular shaped, copper radiating element having an apex and a base is integrally located on the first substrate side, with the triangle's base generally adjacent to the first edge portion of the first substrate side. A generally linear copper feed line extends from the triangle's apex toward the second edge portion of the first substrate side. A rectangular shaped copper ground plane element is integrally located generally adjacent to the second edge portion of the second substrate side. A connector or cable having a ground connection and a feed conductor is physically mounted on the second substrate side so as to generally overlap the ground plane element, with the cable's ground connection being electrically connected to the ground plane element. A hole is provided in the ground plane element and the substrate, and the cable's feed conductor freely penetrates these two generally aligned holes. The feed conductor is then electrically connected to the feed line. In this embodiment of the invention the triangle is preferably an equilateral triangle having an apex and a base.

As a feature of the invention, both the front side and the back side of the antenna's dielectric substrate include electrically interconnected copper ground plane elements that are both located generally adjacent to the above mentioned second edge portion of the substrate.

As a feature of the invention, but without limitation thereto, a method of the invention provides an antenna as above described wherein a thin, planar, dielectric substrate member is first formed such that its two opposing sides are full surface coated with a thin layer or film of copper. The two opposing sides of the substrate member are then processed using known copper masking and copper removal techniques in order to form the above described metal patterns on the two opposing sides of the substrate member.

Antennas in accordance with this invention find utility when installed directly into end use system applications where the antenna is used in its as is form and is cable connected to one or more other devices. An example of such an end use application is a device having a low noise receiver amplifier (LNA), a high power transmitter amplifier (HPA), and a switch for selectively connecting one of the two amplifiers to the antenna's feed cable and then to the antenna's feed line.

Generally, antennas in accordance with this invention find utility when integrated into higher level products, such as mobile cellular telephones, wireless laptop computers and GPS security devices for automobiles, when integrated into fixed position devices having a wireless communication capability, such as personal computers that are connected in a wireless LAN system, or when integrated into hand held devices and fixed position devices where wireless communication is a factor in device utilization. An additional utility of antennas of this invention is in a multi-antenna adaptive antenna system that select a given antenna for use, based upon factors such as the signal strength being received by each of the system's physically spaced antenna's. In this utility of the invention it is within the spirit and scope of this invention to use a dielectric circuit board of the higher level product as the substrate of this invention's unitary antenna or antennas.

Due to the small size and weight of antennas in accordance with this invention, antennas of this invention can be used in many applications where conventional patch antennas are not suitable.

Without limitation thereto, in an as is embodiment of the invention an SMA connector is attached directly to the antenna using a low temperature lead/tin solder alloy, this being the only mechanical joint within the antenna. Other configuration makes use of an RG 142 cable or an RG 174 cable. The antenna itself contains no user serviceable parts, and no in field adjustment is required, although the user may provide a tilt/pan/rotate mount(s) for the antenna, if desired.

Without limitation thereto, the antennas described relative to embodiments of this invention are intended to operate in the frequency range of about 824 to 896 MHz, and at a maximum power of about 50 watts.

In an embodiment of the invention a flat panel antenna is made from a copper clad (i.e. metal clad) laminate (flammability class V–0) having a nominal thickness of about 0.059 inch, with ½ copper being used for the ground plane(s), the radiating element, and the feed line.

In an embodiment of the invention the antenna comprises a thin, flat, rectangle or pseudo rectangle shape having a cable/connector side. The antenna may be mounted by providing Velcro brand hook and loop type fastening means on its cable/connector side, or the antenna may be mounted using mounting means that cooperate with any side of the antenna, with any peripheral edge of the antenna, or with the entire peripheral edge of the antenna.

In an embodiment of the invention, the flat panel antenna carries a GPS module on the flat side of the antenna, that is the side that is opposite the cable/connector side of the antenna, and the antenna's ground plane element(s) also provide a ground plane for a GPS antenna that is internal of the GPS module. This antenna/GPS assembly finds utility, for example, when mounted on, or when used with, the dashboard of an automobile. An addition utility of the invention is when the antenna of this invention is integrated as part of a GPS automobile security system, in which event the antenna/GPS assembly is hidden from view, for example under the fabric of the automobile's rear deck.

In an embodiment of the invention the antenna is seal coated with a non-flammable, low VOC, water based, acrylic coating, thus providing an esthetically pleasing antenna, and an antenna that does not require a radome, although the antenna is operable with a radome, if desired.

While cable routing as disclosed relative to embodiments of this invention extend generally perpendicular to a flat plane that is occupied by the flat antenna, thus requiring that the installation location have a mating cable pass through (typically a ⅜ inch hole for a RG-142 cable configuration, or a ¾ inch hole for an SMA jack configuration), edge cable routing, and other cable routings, are considered to be within the spirit and scope of this invention.

In an embodiment of this invention an extension of, or an existing portion of, a flat printed circuit board that forms a portion of another mobile or fixed position device forms the low loss dielectric substrate for a monopole antenna in accordance with this invention. The transmit and/or receive antenna is physically very small, i.e. about a $\frac{1}{6}^{th}$ wavelength antenna, is low cost, is broadband and efficient, and provides omnidirectional H field radiation of energy. As a result of this construction, the antenna can be formed as an integral part of the same circuit board that also provides the transceiver function of virtually any wireless communication device.

These and other features and advantages of the present invention will be apparent to those of skill in the art upon reference to the following detailed description, which description makes reference to the drawing.

BRIEF DESCRIPTION OF THE DRAWING

FIG. 17, consisting of FIGS. 17a and 17b, is a flowchart-showing of a method of designing an antenna in accordance with the invention, making reference to FIG. 16.

DESCRIPTION OF PREFERRED EMBODIMENTS

Figure 1:
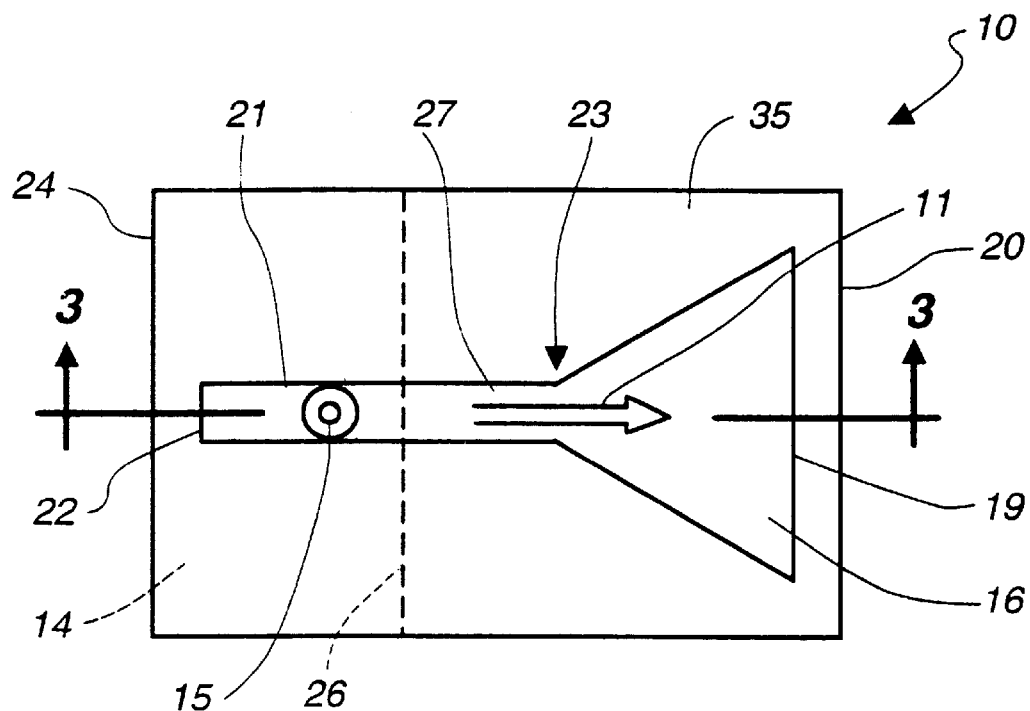
FIG. 1 is a radiating element view of an antenna in accordance with this invention wherein a protective coating has not been applied, and wherein the long axis of the antenna is shown by an arrow.
Figure 2:
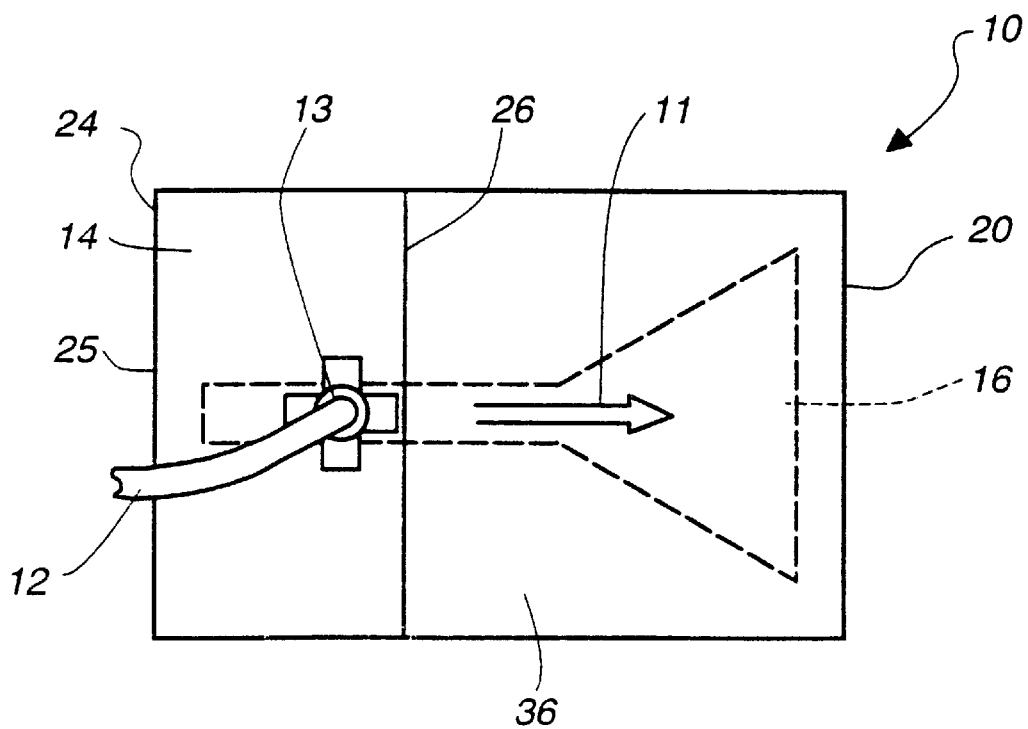
FIG. 2 is a ground plane element view of the antenna of FIG. 1, this figure also showing a feed cable whose exterior grounded sheath is physically mounted on and electrically connected to the ground plane element shown in FIG. 2, and whose center active conductor is connected to the radiating element shown in FIG. 1.
Figure 3:
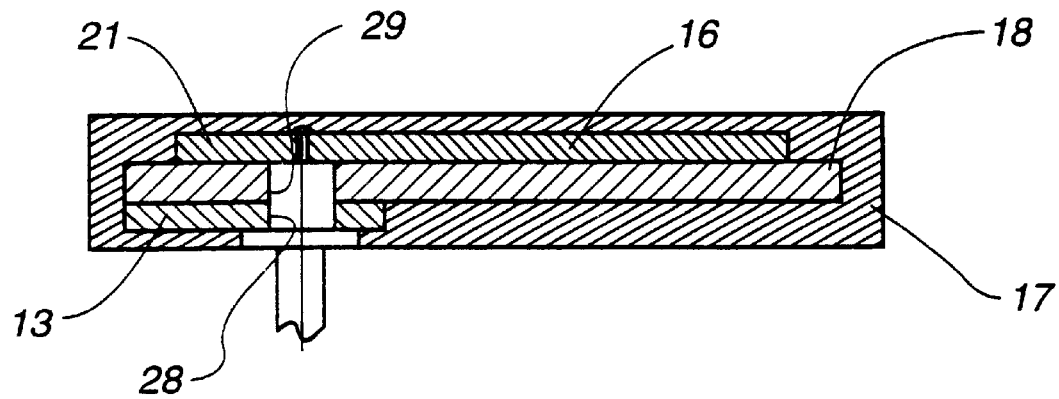
FIG. 3 is a sectioned side view of the antenna of FIGS. 1 and 2, taken on the line 3—3 of FIG. 1, wherein a protective acrylic coating covers and encapsulates the antenna.

FIG. 1 is a top view, i.e. a view from the radiating element side, of an antenna 10 in accordance with this invention wherein a final protective nonconductive plastic coating has not been applied to the antenna, and wherein the centrally located long axis of antenna 10 is shown by arrow 11. FIG. 2 is a bottom view, i.e. a view from the ground plane element side, of antenna 10. FIG. 2 shows a coaxial feed cable 12 whose grounded sheath 13 is physically mounted on, and electrically connected to, the antenna ground plane element 14, with the feed cable's centrally located feed conductor 15 electrically connected to the antenna radiating element 16. FIG. 3 is a sectioned side view of antenna 10 that is taken on line 3—3 of FIG. 1. FIG. 3 shows a protective acrylic coating 17 that is used to cover and encapsulate antenna 10.

Without limitation thereto, in an embodiment of the invention, antenna 10 was formed from a relatively thin glass epoxy rigid laminate substrate 18 whose top and bottom flat surfaces 35 and 36 carry a thin layer, coating or film of a metal such as copper. Copper clad substrate 18 was then processed, for example, by using well-known masking and etching techniques, to provide (1) a first metal pattern on the FIG. 1 side of the substrate, this first metal pattern comprising a triangular shaped metal radiating element 16 whose base 19 is positioned coincident with, or closely adjacent to, a first side edge or edge surface 20 of substrate 18, and to provide a metal feed line 21 that extends from the apex 23 of the triangle, and to provide (2) a second metal pattern on the FIG. 2 side of the substrate, this second pattern comprising a metal ground plane element 14 having a first edge 25 that is positioned coincident with, or closely adjacent to, the second side edge or edge surface 24 of substrate 18, and having a second edge 26 that dimensionally overlaps a portion of feed line 21, but does not overlap radiating element 16.

In a preferred embodiment of the invention, but without limitation thereto, substrate 18 was a rectangle, radiating element 16 was formed as a triangle having two equal length sides that joint to form apex 23 and having a base that is equal or unequal in length to the sides, thus placing apex 23 coincident with the antenna long axis 21, feed line 21 was formed as a centrally located rectangle coincident with the antenna long axis 11 with one end 27 of feed line 21 coincident with the apex 23 of equilateral triangle 16, and with the other end 22 of feed line 21 spaced from the substrate second side edge or edge surface 24, ground plane element 14 was formed as a rectangle, and coating 17 was a flexible and non-flammable acrylic water-based coating.

Figure 12:
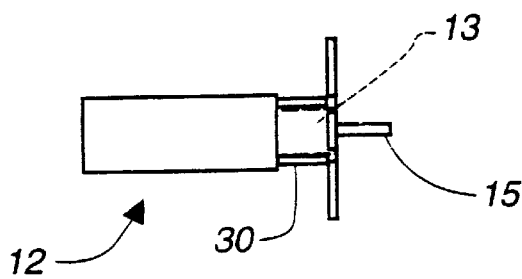
FIG. 12 shows one form of an electrical connector that is useful in the invention, this connector comprising a coaxial cable having a centrally located feed conductor and a metal sheath, wherein a metal flange has been soldered to the cable's exposed metal sheath.
Figure 13:
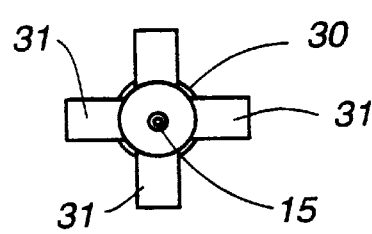
FIG. 13 is an end view of FIG. 12 and better shows the tab portions of the metal flange that are mounted on and electrically connected to the antenna's ground plane element.

The manner of electrically connecting to the antenna's radiating element 16 and ground plane element 14 can take a number of forms within the spirit and scope of this invention. For example, one edge connector can be connected to feed line 21, and a second edge connector can be connected to ground plane element 14. In an embodiment of the invention, first and second aligned through holes 28 and 29 are formed, respectively, in metal ground plane element 14 and dielectric substrate 18. With reference to FIGS. 12 and 13, the metal sheath 13 of coaxial feed cable 12 is exposed, and an annular copper clip 30, having a number of radially extending tabs 31, is then soldered to sheath 13. By way of solder or the like, and using metal tabs 31, cable 12 is mounted on, and sheath 13 is electrically connected to, metal ground plane member 14 at the annular metal portion of ground plane element 14 that surrounds through hole 28. In this mounted position of cable 12, centrally located feed conductor 15 freely passes through holes 28, 29 and physically engages feed line 21. By way of a hole or the like within feed line 21, feed conductor 15 is secured to, and soldered to, feed line 21.

Figure 14:
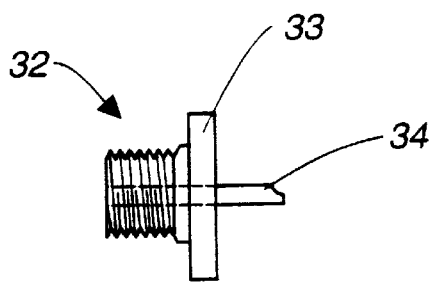
FIG. 14 show another form of an electrical connector that is useful in the invention, this connector comprising a threaded metal ground element and a centrally located metal feed conductor.

As an alternative to the FIGS. 12 and 13 connection arrangement, the conventional threaded metal coupling 32 of FIG. 14, having a flat and planar metal ground flange 33 and a central feed conductor 34 can be used to provide electrical connection to the antenna's ground plane element 14 and feed line 21.

Figure 4:
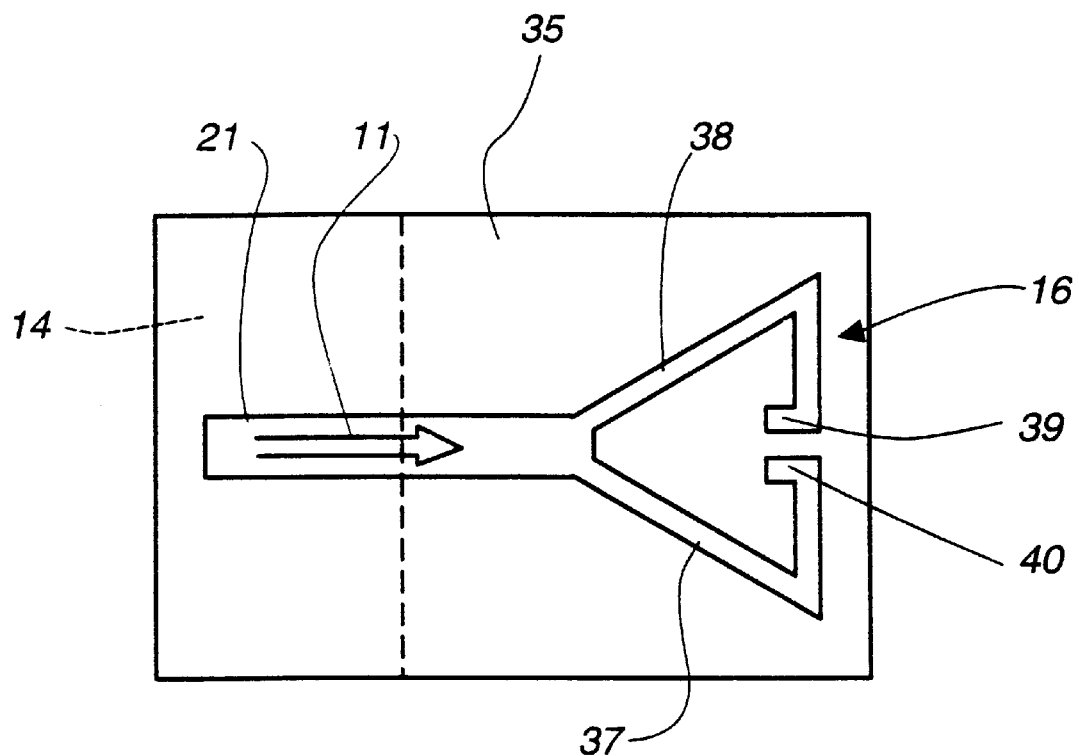
FIG. 4 is a view similar to FIG. 1 showing how a radiating element that is made up of convoluted metal conductors can be used in embodiments of the invention to provide an antenna having equivalent properties to antennas that utilize the solid metal FIG. 1 type of radiating element, but which antennas are physically shorter in the direction of the antenna's long axis, this providing a more compact antenna.

As noted above, a feature of the invention is that radiating element 16 is triangular or pseudo triangular in shape, and more preferably an isosceles or an equilateral triangle. While a solid metal radiating element shape is shown in figures of this application, it is within the spirit and scope of this invention to provide a convoluted metal pattern whose outline is in the form of a radiating element. Such an embodiment is shown in FIG. 4 where triangular shaped radiating element 16 is shown as being outlined by two convoluted metal conductor patterns 37 and 38 having reentrant portions 39 and 40. A valuable utility of the small size antenna 10 that is provided by this invention, for example, a $\frac{1}{6}^{th}$ wave antenna, is to integrate antenna 10 within a small wireless communication device, such as a wireless laptop computer or a cellular telephone, for example by using a portion of a printed circuit board that is within the wireless communication device as the dielectric substrate 18 of the antenna 10.

Figure 6:
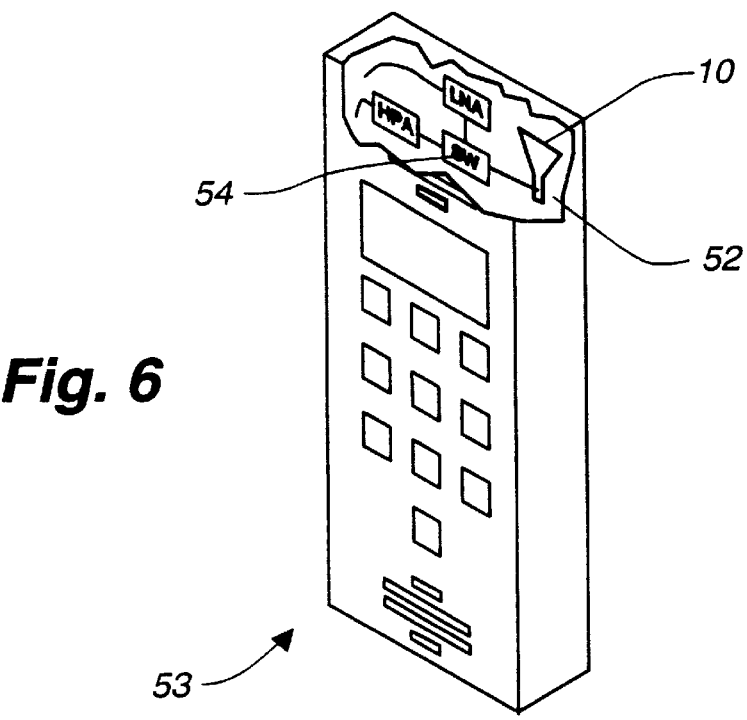
FIG. 6 shows how an antenna in accordance with this invention can be manufactured using as the antenna's substrate a printed circuit board or the like that is within a mobile wireless communication device such as a cellular telephone, wherein a switch means is provided to selectively connect the antenna to a Low Noise Amplifier (LNA) during a receive mode of operation of the telephone, or to connect the antenna to a high power amplifier (HPA) during a transmit mode of operation of the telephone.
Figure 5:
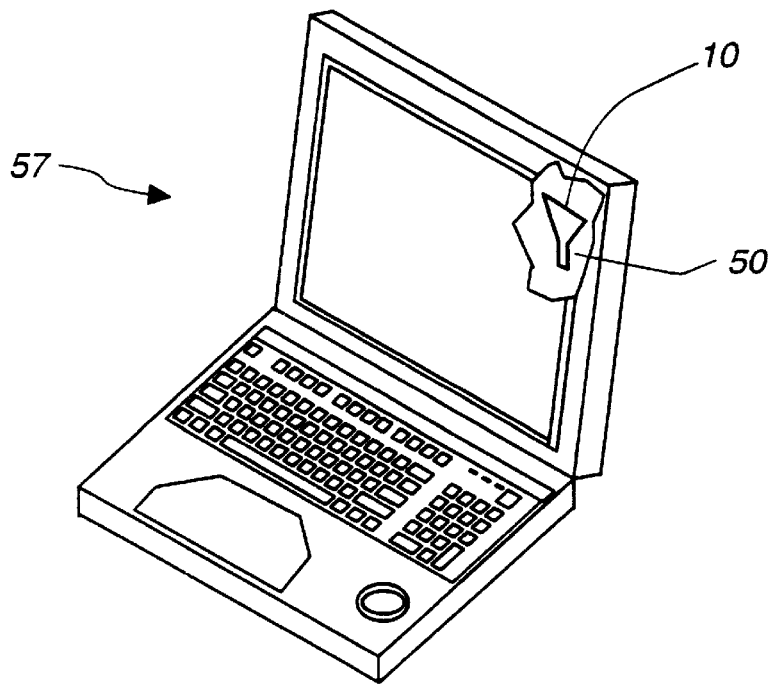
FIG. 5 shows how an antenna in accordance with this invention can be manufactured using as the antenna's substrate a printed circuit board or the like that is within a wireless laptop computer.

FIG. 5 shows how antenna 10 in accordance with this invention can be manufactured using as the antenna substrate a printed circuit board 50 or the like that is already within wireless laptop computer 51, and which serves other purposes. FIG. 6 shows how antenna 10 in accordance with this invention can be manufactured using as the antenna's substrate, a printed circuit board 52 or the like that is within a mobile wireless communication device, such as cellular telephone 53. In FIGS. 5 and 6, antennas 10 provide the transmit and/or receive functions that are needed by a transceiver circuit (not shown) that is contained within the devices 51 and 53. In telephone 53, a switch means 54 is provided to selectively connect antenna 10 to a Low Noise Amplifier (LNA) 55 during a receive mode of operation of telephone 53, or to connect antenna 10 to a High Power Amplifier (HPA) 56 during a transmit mode of operation of telephone 53.

This utility of the present invention is virtually limitless since any wireless communication device, be it a mobile device of a fixed position device, will find the present invention to be of great value. In addition, adaptive antenna systems wherein one of a number of antennas is used in accordance with the different signal strengths that are provided by the individual antennas, will also find the small and low cost antennas of the present invention to be of great value. Another example of the utility of antennas in accordance with this invention is in phased antenna arrays. As is apparent from the above description, the embodiment of the invention above described includes one ground plane element that is located on the opposite side of the antenna substrate 18 from the antenna's radiating element.

Figure 7:
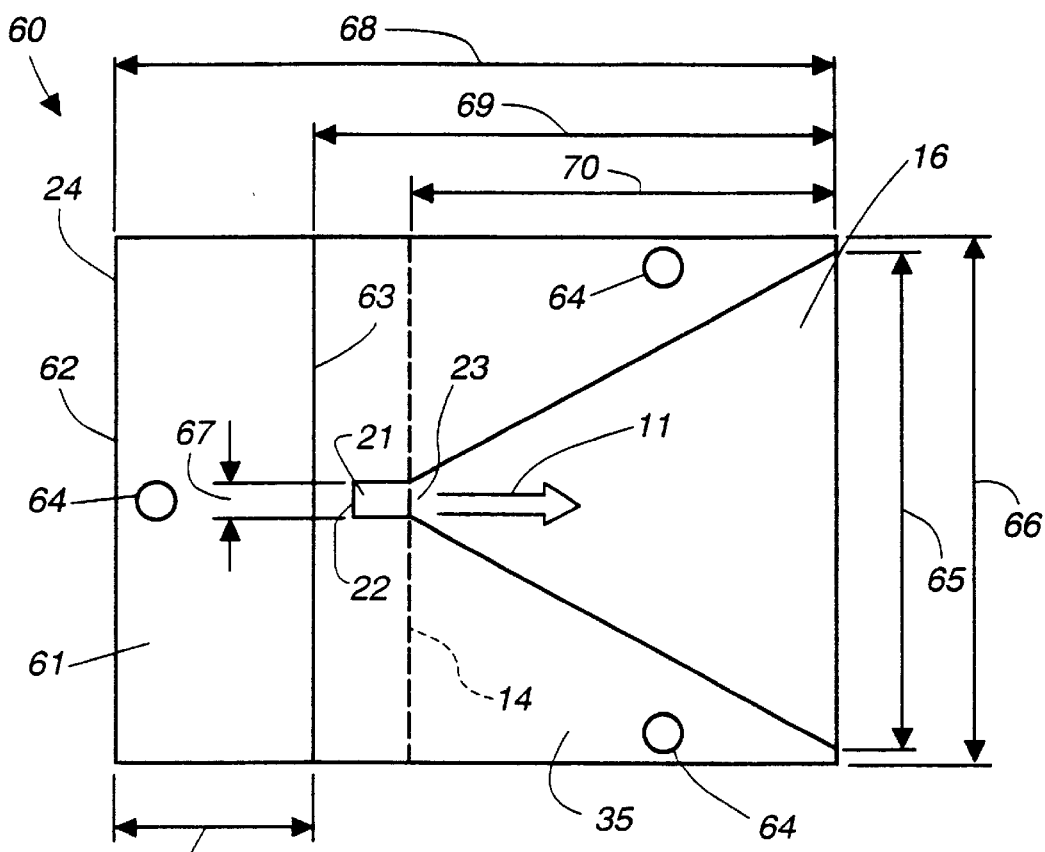
FIG. 7 is a top view of another embodiment of an antenna in accordance with the invention wherein the antenna includes two ground plane elements.
Figure 8:
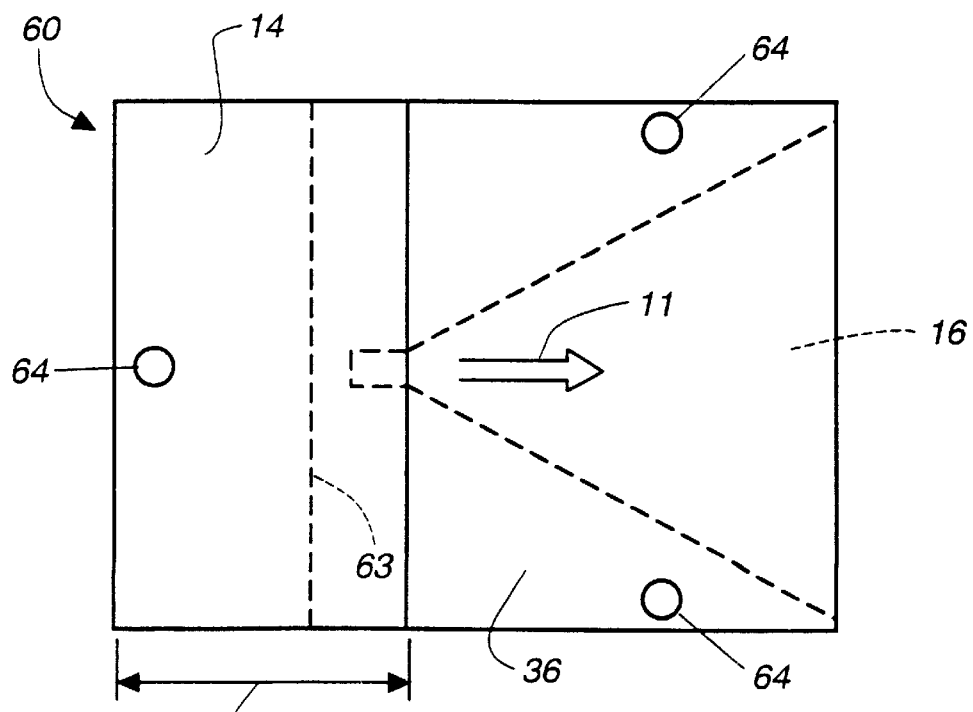
FIG. 8 is a bottom view of the antenna of FIG. 7.

FIGS. 7 and 8 show an embodiment of the invention wherein an antenna 60 in accordance with the invention includes a second, smaller size, metal ground plane element 61 that is located on the same side of dielectric substrate 18 as metal radiating element 16. FIG. 7 is a top view of such an antenna 60, showing triangular shaped copper radiating element 16, copper feed line 21, and the second copper ground plane element 61. Preferably, but without limitation thereto, radiating element 16 is an equal length side triangle such that its apex 23 and the antenna feed line 21 are both located on the antenna's centrally located long axis 11. In this embodiment of the invention, the second metal ground plane element 61 is a rectangle that includes a first edge 62 that is located coincident with, or closely adjacent to, the side edge 24 of the antenna dielectric substrate 18, and includes a second edge 63 that is spaced from the end 22 of metal feed line 21. FIG. 8 is a bottom view of antenna 60, showing above-described first copper ground plane element 14.

First and second ground plane elements 14 and 61 can be electrically connected, one to the other, in any of a number of ways, for example by the use of an edge connector (not shown) that connects to both of the ground plane elements 14 and 61. In a side view (not shown), antenna 60 appears much as antenna 10 appears in FIG. 3, with the exception that the second ground plane element 61 is provided in antenna 60.

For purposes of drawing convenience, the connection means whereby electrical ground and electrical feed connections are made to antenna 60 is not shown. As will be appreciated, edge connectors can be used, or the arrangements above described with respect to antenna 10 can be used with antenna 60, and antenna 60 is useful in the same manner as above described relative to antenna 10. In FIGS. 7 and 8, three through holes 64 are shown to provide a means for mounting antenna 60. In use, bolts, screws, or the like are used with holes 64 to mount antenna 60 when antenna 60 is a stand-alone antenna; i.e., when antenna 60 is not integrated into a device by using a portion of the device as the antenna's substrate 18.

With reference to FIGS. 7 and 8, in a 860 MHz embodiment of the invention, the width 66 of antenna 60 was about 3.00-inch, the base of radiating element 16, i.e., dimension 65, was about 2.79-inch, the length 68 of antenna 60 was about 4.4-inch, the height 70 of radiating element 16 was about 2.79-inch, the total height 69 of radiating element 16 and feed line 21 was about 3.08-inch, the width 67 of feed line 21 was about 0.20-inch, the height 71 of first ground plane element 14 was about 1.63-inch, the height 72 of second ground plane element 61 was about 1.23-inch, and the thickness of antenna 60 (i.e., the antenna dimension that is perpendicular to the plane of FIGS. 7 and 8) was about 0.13-inch.

Figure 9:
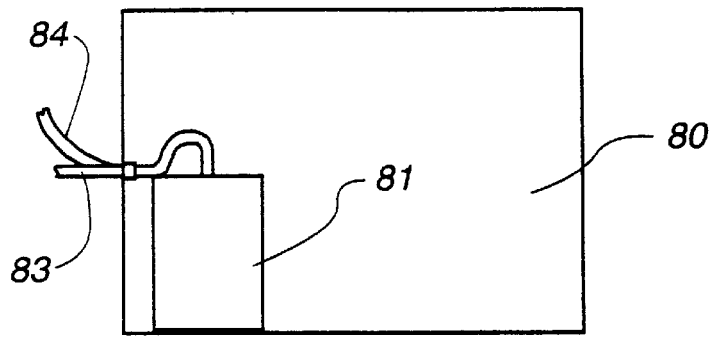
FIG. 9 shows an embodiment of the invention wherein the top acrylic coated surface of an antenna in accordance with the invention physically mounts a GPS module having an internal GPS antenna, and wherein the ground plane element (s) of the invention also function as the ground plane for the GPS antenna.
Figure 10:
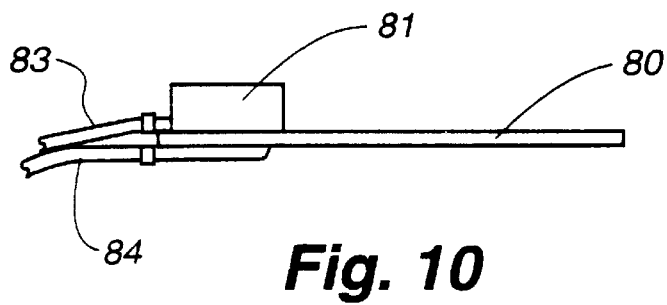
FIG. 10 is a side view of the antenna/GPS assembly of FIG. 9.
Figure 11:
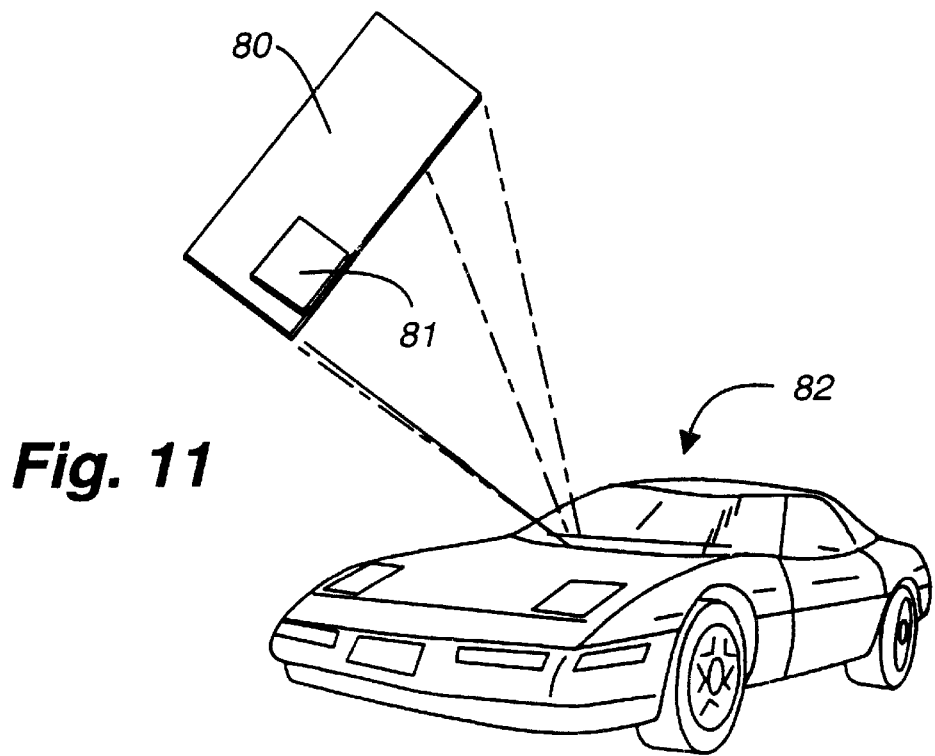
FIG. 11 shows a utility of the antenna/GPS assembly of FIGS. 9 and 10 wherein the antenna/GPS assembly is mounted on the dashboard of an automobile, to thus provide both a GPS function and a wireless communication function, such as a cellular telephone function to the operator of the automobile.

FIGS. 9, 10 and 11 show a utility of the invention wherein the ground plane element(s) of an antenna 80 in accordance with this invention also provides a ground plane function for another device 81 having its own internal antenna.

More specifically, FIGS. 9, 10 and 11 show an embodiment of the invention wherein the top acrylic coated surface of an antenna 80 in accordance with the invention physically mounts a GPS module 81 having an internal GPS antenna (not shown), and wherein the ground plane elements 14 and/or 61 of the invention also function as the ground plane for the GPS antenna that is within module 81. An example of the utility of such an embodiment of the invention is shown in FIG. 11 wherein the antenna/GPS assembly 80/81 is mounted on the dashboard of an automobile 82 (or is hidden under the fabric of the automobile rear deck), to thus provide both a GPS function and a wireless communication function, such as a cellular telephone function, to the operator of automobile 82. In this embodiment of the invention, a first cable 84 is connected to antenna 80 to provide the wireless communication function, and a second cable 83 is connected to GPS module 81 to provide the GPS function.

The above description of various embodiments of the invention have all dealt with flat metal, or copper, radiation elements that are triangular in shape, and more specifically metal patterns that are isosceles triangles, or which an equilateral triangle is an example. However, the spirit and scope of the present invention is not to be limited thereto. In general, the antenna's radiating element is in the shape of a planar geometric figure that has a first portion that is located adjacent to, or is closely spaced from, one end or edge of the antenna dielectric substrate, and that has a second portion that is located intermediate the substrate's two opposite ends or edges, and wherein a metal feed line extends from the radiating element second portion in a direction toward the second end or edge of the dielectric substrate.

Figure 15:
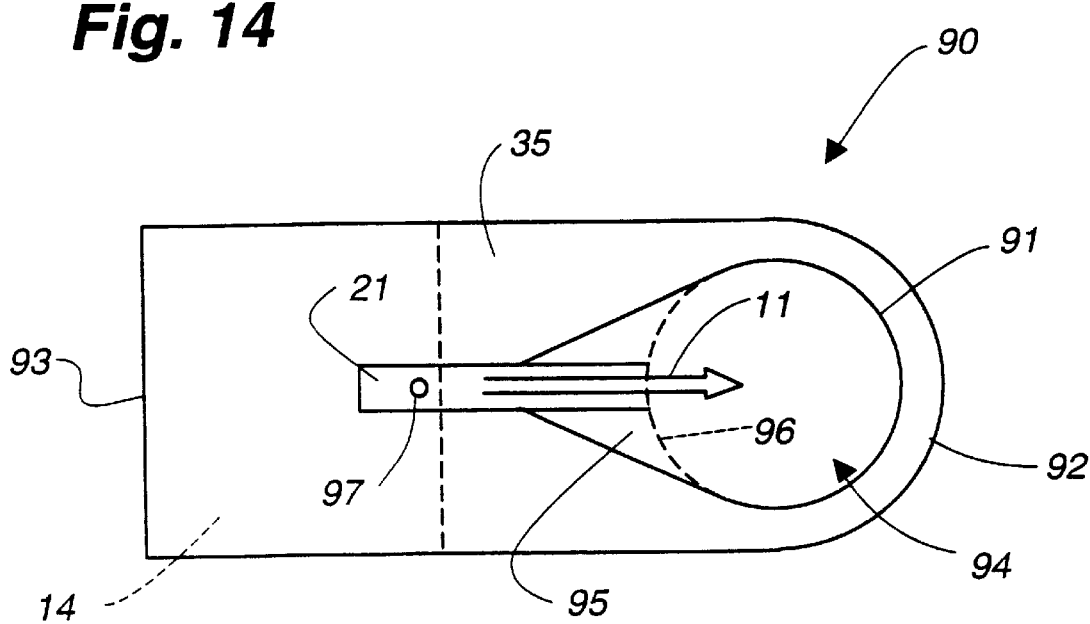
FIG. 15 is a top view, or a radiating element view, of an antenna in accordance with the invention wherein the geometrically shaped flat metal radiating element is in the form of a pseudo-triangle.

This aspect of the invention will be more apparent from a consideration of FIG. 15. FIG. 15 is a top view, or a radiating element view, of an antenna 90 in accordance with the spirit and scope of this invention. Antenna 90 includes a ground plane element 14, as above described, and may include a second ground plane element 61, although this second ground plane element is not shown in FIG. 15. The manner of electrically connecting to radiating element 91 of FIG. 15, and to the antenna ground plane element(s) is as above described, and in an embodiment of the invention, antenna 91 is formed from a metal clad, or copper clad, thin dielectric substrate whose radiating element substrate surface is shown at 35. In this embodiment, substrate 18 is provided with a first curved or arched edge 92 and a linear edge 93, the two edges 92, 93 being spaced from each other along the antenna's long axis 11.

Within the spirit and scope of this invention, radiating element is considered to be a geometrically shaped flat metal radiating element 91 that is located on substrate surface 35, this radiating element 91 having a first area 94 that is located generally adjacent to substrate edge 92, and this radiating element 91 having a second area 95 that is located intermediate substrate edges 92 and 93. As before, a flat metal feed line 21 is formed as an extension of this second area 95, the feed line extending from second area 95 toward substrate edge 93.

As a feature of FIG. 15, and as shown by dotted line 96, a showing of the shape of a generally circular or elliptical radiating element 91 and its feed line 21 is provided.

As another feature of FIG. 15, the first area 94 of tear drop shaped, or pseudo triangle shaped, radiating element 91, as measured in the plane of substrate surface 35, is wider than second area 95, this also being a geometric characteristic of a triangle shaped radiating element 91, an isosceles triangle shaped radiating element 91, and an equilateral triangle shaped radiating element 91. In addition, feed line 21 extends from the second area 95 of these variously shaped radiating elements 91, in a direction toward substrate edge 93.

While not shown in FIG. 15, but as above described, antenna 90 of FIG. 15 may include the first through opening formed in ground plane element 14 at a location 97 that underlies the overlying portion of feed line 21, and a second through opening may be formed in the substrate generally coincident with the first through opening 97. In this way, a ground connection can be electrically made to ground plane element 21; and a feed connection can be electrically made by passing a feed conductor through the two through holes and electrically connecting to the portion 97 of feed line 21.

Again, a protective acrylic coating may be provided to cover, protect, and encapsulate antenna 90.

It should also be noted that within the spirit and scope of this invention, radiating element 91 of FIG. 15 can be made up of a number of individual convoluted conductors that wind to describe the outline of radiating element, as was above described relative to FIG. 4.

An important feature of the present invention is a method by which an antenna, such as is shown in FIGS. 1 and 2, is designed for operation at a desired frequency and with a desired frequency-bandwidth that is generally centered upon the desired operating frequency. This important feature of the present invention will now be described with reference to FIGS. 16 and 17.

Figure 16:
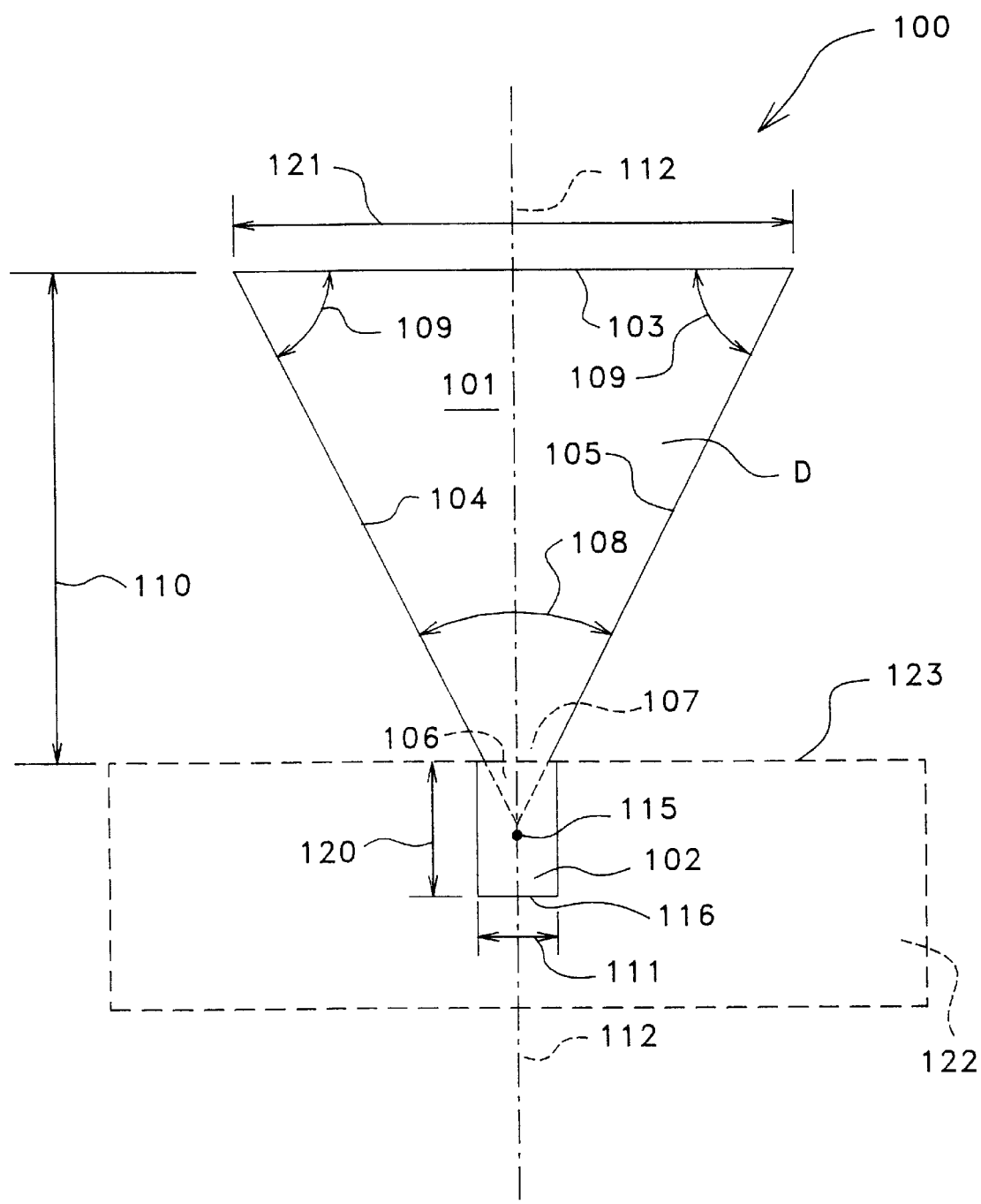
FIG. 16 is a figure similar to FIGS. 1 and 2 that is useful in understanding a method of designing an antenna in accordance with the invention.

With reference to FIG. 16, an antenna 100 to be designed includes a triangular-shaped and planar radiating element 101 and a rectangular-shaped and planar feed line 102, both of which are located on the same side of a thin dielectric substrate member (not shown). The opposite side of the substrate member includes a planar ground plane element 122. All of the members 101, 102 and 122 are formed of a metal such as copper, and members 101 and 102 are preferably formed from the same sheet or layer of a metal such as copper.

Radiating element 101 includes a linear base side 103 and two linear inclined-sides 104 and 105 which would, if extended, form an apex area 106. As will be apparent, an end of feed line 102 forms a short apex side 107 of radiating element 101.

In a non-limiting embodiment of the invention, inclined sides 104, 105 were of equal length, apex angle 108 was about 50-degrees, angles 109 were both about 65-degrees, and radiating element 101 and feed line 102 were both centered upon a centrally-located axis of symmetry 112 of antenna 100.

In the following description, the height of radiating element 101 is indicated by dimension 110 and the width of feed line 102 is indicated by dimension 111.

It is to be noted that as the width 111 of feed line 102 is increased or decreased, the length of apex side 107 of radiating element 101 correspondingly increase or decreases. If the length of base side 103 is considered to be a constant, the height dimension 110 of radiating element 101 decreases or increases as the width 111 of feed line increases or decreases.

A method step of FIG. 17b (to be described) provides that the height 110 of radiating element 101 can be changed by moving base side 103 relative to apex side 107, if such a change is needed in order to achieve a desired result. Of course, such a change in height 110 will produce a change in the length of the base side 103 of radiating element 101. For example, but only if desired, the height 110 of radiating element 101 can be maintained as a constant as the width 111 of feed line 102 is increased or decreased, such that an increase in the width 111 of feed line 102 produces both an increase in the length of apex side 107 and an increase in the length of base side 103.

As above described, radiating element 101 and feed line 102 are preferably carried on one side of a circuit-board type substrate, and ground plane element 122 is carried on an opposite side of the substrate with the edge 123 of ground plane element 122 maintained generally coincident with the apex side 107 of radiating element 101. When the width 111 of feed line 102 is increased or decreased, as above described, the position of edge 123 of ground plane element 122 is then moved to be coincident with the correspondingly longer or shorter apex side 107 of radiating element 101.

With reference to FIG. 17a, at step 200 a center frequency of operation (Fc) for antenna 100 of FIG. 16 is selected. For example, but without limitation thereto, a center operating frequency that is within the 824 MHz to 896 MHz range is selected.

For any given operation of the method of FIG. 17a, this center frequency is a first invariable parameter. A second invariable parameter of the method is the impedance of an antenna input feed, for example a coaxial connector or cable that connects to feed line 102 at point 115, or a connector that connects to the end 116 of feed line 102. In this example, but without limitation thereto, the impedance of such an antenna input-feed is assumed to be 50 ohms.

At step 201 of FIG. 17a, radiating element 101 is provided with a height dimension 110 based upon the type of antenna being designed. As a non-limiting example, assume that antenna 100 is to be a $\frac{1}{6}^{th}$ wavelength in-air antenna. In this case, height 110 would be set at a value that is about equal to $3 \times 10^8$ divided by $6 \times Fc$, where Fc is expressed in Hz and height 110 is expressed in meters.

At step 202, the width 111 of feed line 102 is determined such that the impedance of feed line 102 is known to be less than the impedance of the antenna input feed; i.e., less than 50 ohms in this example. Typically, but without limitation thereto, the width 111 of feed line 102 that is selected at step 202 is about 1.2 times a width of feed line 102 that would provide a 50 ohm impedance to feed line 102.

At step 203 the length 120 of feed line 102 is set to the shortest convenient length for a particular use of antenna 100; i.e., dimension 120 is not critical to the method of FIG. 17a. Dimension 120 is typically about 0.3-inch.

At step 204, the apex angle 108 of a radiating element 101 is set typically at about 50-degrees. For a radiating element 101 that is symmetrical about axis 112, and with height 110, width 111 and apex angle 108 now known, the length 121 of base side 103 can be determined at step 205, and antenna 100 is then constructed at step 206.

At the end of step 206, an antenna 100 in accordance with the invention has been constructed in accordance with steps 200–206. Testing now takes place in accordance with FIG. 17b.

With reference to FIG. 17b, at step 207 an appropriate input feed is connected to point 115 or point 116 on feed line 102, for example, a 50 ohm input feed is connected to 115 or 116.

At step 208, a network analyzer is connected to the antenna input feed, and the antenna is excited with a band of frequencies that include frequencies both above and below the center frequency Fc that was selected in step 200 of FIG. 17a. Typically, this band of frequencies extends about 20-percent above and about 20-percent below the selected frequency Fc.

At step 209, instrumentation such as the network analyser is used to measure the actual center frequency (Fca) of the antenna.

As a result of the operation of step 209, a determination is now made as to how close the antenna that was constructed in steps 200–206 of FIG. 17a is to an ideal antenna, wherein an ideal antenna is defined as an antenna that has a bandwidth of a desired width, the center frequency of the bandwidth being about equal to the center operating frequency Fc that was selected in step 200.

Based upon the outcome of step 209, it may be necessary to construct a second and different-size antenna 100 (and perhaps even more than one additional antenna 100) using steps 200–206 of FIG. 17a, and then test this second antenna using steps 207–209 of FIG. 17b, as described below.

This building of another antenna 100 for testing is shown at step 210 whereat the height 110 of that antenna radiating element 101 is changed in a direction that produces (or more nearly produces) the desired result Fca=Fc out of step 209, and at step 211 whereat the width 111 of that antenna feed line 102 is changed in a direction that is know to produce (or to more nearly produce) a desired bandwidth wherein the frequency Fc is about the center frequency.

In general, when Fca of a given antenna 100 is greater than the desired Fc for that antenna, the antenna height 110 is increased when building another antenna 100 for testing, and when Fca is less than Fc, the antenna height 110 is decreased. For a given antenna 100, width 111 of feed line 102 may need to be either increased or decreased in order to increase the bandwidth of the antenna.

As shown by step 212 this rebuilding and retesting of antennas is repeated until an antenna design is found whereat a maximum bandwidth is achieved, this bandwidth including the desired frequency Fc as about the center frequency.

While the invention has been described in detail while making references to embodiments thereof, it is recognized that those skilled in that art will, upon learning of this invention, visualize other embodiments that are within the spirit and scope of this invention. Thus, the above detailed description should not be taken as a limitation on the spirit and scope of this invention.

What is claimed is:

1. A method of determining the physical dimensions of an antenna having a generally triangular radiating element, having a linear feedline, one end of which includes an apex-area that is defined by a linear extension of two inclined sides of said radiation element, and having a ground plane element that is electrically isolated from and that underlies only said feedline and said apex area, said antenna having an input feed of a known impedance that is connected to said feedline, the method comprising the steps of:

selecting a desired center frequency of operation of said antenna;

selecting a height of said radiating element as measured from said end of said feedline to a base line of said radiation element, wherein said height is selected as a function of the wavelength of operation of said antenna and said desired center frequency of operation;

determining a width of said feedline that produces a feedline impedance that is less than said known input feed impedance;

selecting an apex angle for said apex area;

construct an antenna having physical dimensions in accordance with the above-defined steps;

connecting a first electrical instrument to said input feed and energizing said antenna with a frequency band that includes said desired center frequency;

using a second electrical instrument to determine a bandwidth of operation of said energized antenna; and adjusting said height of said radiating element and/or said width of said feedline to achieve a desired bandwidth of operation of said energized antenna wherein said desired center frequency is within said desired bandwidth of operation.

2. The method of claim 1 wherein said desired bandwidth of operation is a maximum bandwidth of operation.

3. The method of claim 1 wherein said input feed is connected to a portion of said feedline that excludes said apex area.

4. The method of claim 1 wherein:

said antenna is a $\frac{1}{6}^{th}$ wavelength antenna; and said selected width of said feedline is about equal to the value in inches of 1.2 times the width of a feedline having an impedance equal to said known impedance.

5. The method of claim 1 wherein said apex angle is about 65-degrees.

6. The method of claim 1 wherein said energization of said antenna with a frequency band comprises energizing said antenna with a band of frequencies that includes said desired center frequency, plus and minus about 20-percent of said desired center frequency.

7. The method of claim 1 wherein:

said input feed is connected to a portion of said feedline that excludes said apex area;

said antenna is a $\frac{1}{6}^{th}$ wavelength antenna;

said selected width of said feedline is about equal to the value in inches of 1.2 times the width of a feedline having an impedance equal to said known impedance said apex angle is about 50-degrees;

said first electrical instrument is a network analyser;

said energizing of said antenna with a frequency band comprises energizing said antenna with a band of frequencies from about 20-percent less than said desired center frequency to about 20-percent greater than said desired center frequency; and said second electrical instrument is a network analyser.

8. A method of designing the physical size of a planar antenna having a generally triangular shaped and a planar radiating element having a base side and two inclined sides that terminate at opposite ends of said base side, having a rectangular-shaped feedline, one width end of which includes an apex area that is defined by a linear extension of said inclined sides of said radiation element, said width end of said feedline providing an apex side for said radiating element, and having a ground plane element that is electrically isolated from but underlies only said feedline and said apex area, said antenna having an input feed of a known impedance that is connected to said feedline, the method comprising the steps of:

selecting a desired center frequency of operation of said antenna;

selecting a height of said radiating element as measured from said width end of said feedline to said base line;

said height being selected as a function of a wavelength of operation of said antenna and said desired center frequency of operation;

determining a length of said width end of said feedline that produces a feedline impedance that is less than said known impedance;

selecting an apex angle for said apex area;

construct an antenna having physical dimensions in accordance with the above-defined steps;

connecting a first electrical instrument to said input feed and energizing said antenna with a frequency band that includes said desired center frequency;

using a second electrical instrument to determine a bandwidth of operation of said energized antenna; and adjusting said height of said radiating element and/or said width of said width end of said feedline to achieve a desired bandwidth of operation of said energized antenna such that said desired center frequency is generally centered within said desired bandwidth of operation.

9. The method of claim 8 wherein said desired bandwidth of operation is a maximum bandwidth of operation, and including the step of repetitively adjusting said height of said radiating element and/or said width of said width end of said feedline.

10. The method of claim 9 wherein:

said inclined sides of said radiating element are of equal length;

said apex angle is about 50-degrees; and said feedline is centered upon a line that bisects said apex angle.

11. The method of claim 10 wherein said input feed is connected to a portion of said feedline that excludes said apex area.

12. The method of claim 11 wherein:

said antenna is a $\frac{1}{6}^{th}$ wavelength antenna;

said known input impedance of said input feed is about 50 ohms; and said width of said width end of said feedline is initially selected to be about equal to the value in inches of 1.2 times the width of a feedline having an impedance of 50 ohms.

13. The method of claim 12 wherein said energization of said antenna with a frequency band comprises energizing said antenna with a band of frequencies that includes said desired center frequency, plus and minus about 20-percent of said desired center frequency.

* * * * *